United States Patent Office 3,440,874
Patented Apr. 29, 1969

3,440,874
VACUUM EVAPORATION PROCESSES
Alan R. Beavitt, Ilford, England, assignor to The Plessey Company Limited, Ilford, England, a British company
Filed Sept. 20, 1966, Ser. No. 580,819
Claims priority, application Great Britain, Sept. 24, 1965, 40,796/65
Int. Cl. G01b *19/08*
U.S. Cl. 73—150                                    10 Claims

ABSTRACT OF THE DISCLOSURE

A device for monitoring the thickness of material deposited by a vacuum evaporating process or the rate of deposition thereof including a cylindrical rotor adapted for rotation about its axis and disposed in a magnetic field, the evaporated material impinging on only a part of the surface of said rotor. The rotor may also be formed from a disc rotatable about its axis and disposed in a magnetic field, the evaporated material impinging on only a portion of surface of the disc. In both embodiments, the total angle of rotation and the instantaneous speed of rotation of the rotor are measured to provide an indication of the thickness of the deposited material and the rate of deposition respectively.

---

This invention relates to vacuum evaporating processes and to devices for monitoring the thickness of deposited material, and/or the rate of deposition of material, during such processes.

When a layer of material is deposited on a substrate using an evaporation process, such as in the preparation of thin film circuit components, it is very often required to know the thickness of the layer at any time during the deposition process, and also the rate at which the layer is being deposited on the substrate. One of the prime requisites of a monitoring device for this purpose is that it should withstand being heated to high temperatures.

According to one main feature of the present invention, in a vacuum evaporation process evaporated material is caused to impinge on part of the surface of a rotor of a thickness and rate monitoring device, the total angle of rotation and the instantaneous speed of rotation of the rotor being measured to provide an indication of the thickness of the deposited material and the rate of deposition respectively.

According to a subsidiary feature the monitoring device may comprise a lightweight rotor on which material being evaporated impinges and which has magnetic damping means associated with it, the device including means for measuring the total angle and the speed of rotation of the rotor without imposing a load on it.

According to another subsidiary feature of the invention the rotor comprises a hollow cylinder which is rotatable about its axis, the cylinder may be mounted with its axis vertical and conveniently one end of the cylinder may then include support means for a bearing which will enable the cylinder to be supported and allow it freedom to be rotated.

According to yet another subsidiary feature of the invention the rotor comprises a disc which is supported on a bearing lying on its axis so that the bearing will be generally above the centre of gravity of the disc.

According to a further subsidiary feature the angle through which, and the rate at which the rotor is turned in response to the impingement may be detected by optical means. The optical means may comprise an edge of the rotor being serrated and the serrations being used to interrupt a beam of light.

According to another main feature of the present invention there is provided a vacuum evaporation process in which material being evaporated impinges on one of the major surfaces of a rotatable disc of a rate monitoring device, the said disc being suspended by a suspension element which causes a torque to be applied to the disc in opposition to rotational movement caused by impingement of material thereon, the disc assuming a steady angular position representative of the rate of evaporation of the material and said device including means for indicating the angular position of the disc with respect to a rest position.

A suitable rate monitoring device for carrying out the process according to the last preceding paragraph may comprise a rotor of dished form to afford improved rigidity and stability over that of a plane rotor.

Some exemplary embodiments of the invention will now be described with reference to the drawings accompanying the specification in which.

Figure 1:
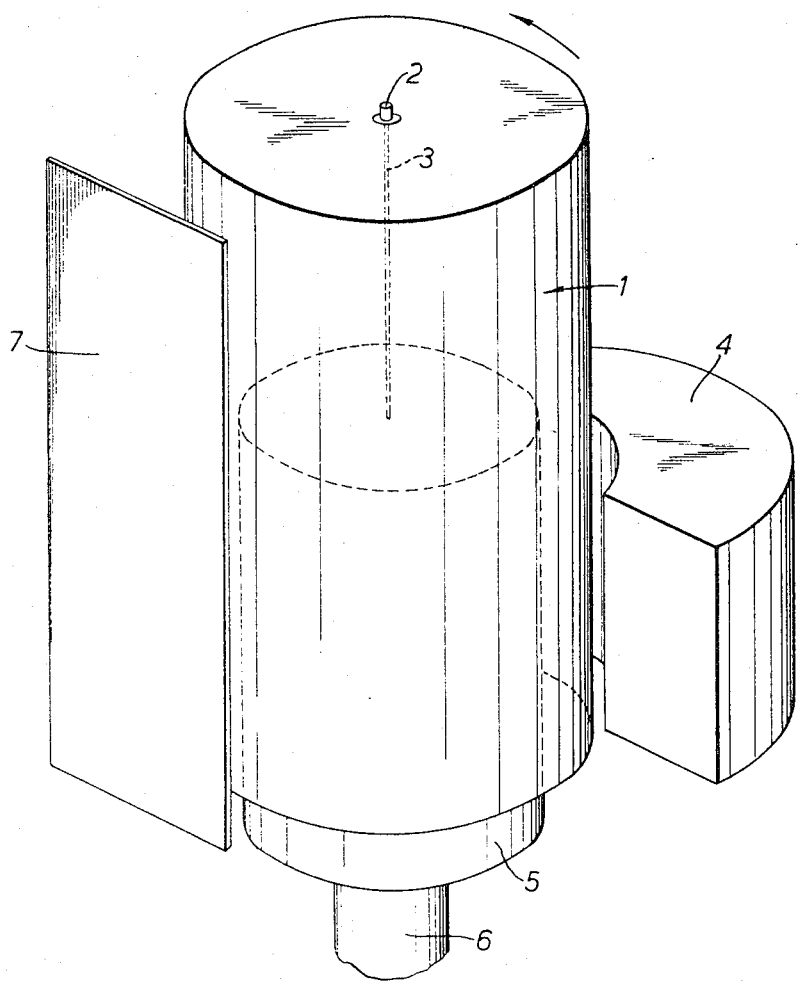
FIGURE 1 shows a construction of a thickness and rate monitor using a cylindrical rotor.

FIGURE 1 shows a construction of a cylinder type thickness and rate monitor suitable for use where techniques of evaporation in a generally horizontal direction are used. A hollow cylindrical rotor 1, which is ideally constructed from a material having a high strength/weight ratio, such as aluminium-magnesium alloy, has a bearing 2 positioned in the centre of one end, and is mounted on a needle pivot 3 so that the rotor is free to rotate. A part annular magnet 4 is placed externally to the cylinder, and to increase its effectiveness a cylinder 5 of ferrous material, preferably soft mild steel, is placed inside the rotor, the whole being mounted on a rigid support 6. A shield 7 is positioned so that the evaporant is allowed to impinge only on one side of the rotor, the direction of flow of the evaporant being perpendicular to the shield, so causing a rotary action to be set up in the rotor. Due to the movement of the rotor in the magnetic field, eddy currents are set up in the rotor which have the effect of damping its motion and this damping effect can be varied by moving the magnet nearer or further from the rotor. Total the number of times the rotor rotates whilst an evaporation process is in operation, i.e., the total angle of rotation of the rotor, is an indication of the amount of evaporant impinging on the rotor and hence is an indication of the thickness of any deposit of the evaporant whilst the speed of rotation is an indication of the density of the evaporant and hence is an indication of the instantaneous rate of deposit of the evaporant. The frequency and speed of rotation of the rotor may conveniently be measured by having part or parts of the rotor (not shown) interrupting a beam of light causing pulses to be set up which can be counted using counting techniques.

Figure 2:
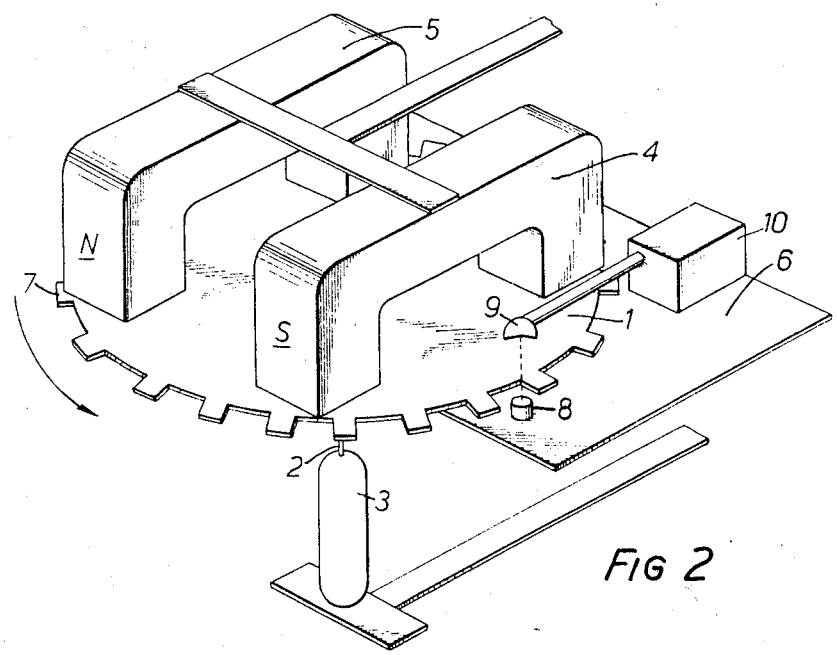
FIGURE 2 shows a construction of a thickness and rate monitor using a disc type rotor.

FIGURE 2 shows the construction of a disc type thickness and rate monitor for use where techniques of evaporation in a generally vertical direction are used. An aluminium foil disc-shaped rotor 1 has a central bearing (not shown) and is mounted on a needle pivot 2 which is mounted on a rigid support 3. Two magnets 4 and 5 are situated symmetrically above the rotor and by means not shown it is possible to vary the spacing between the rotor and the magnets. A shield 6 is positioned beneath the rotor so that the evaporant, the direction of which is nearly vertically upwards, is allowed to impinge only on one side of the rotor so causing a rotary action to be set up. The movement of the rotor in the magnetic field of the magnets causes eddy currents to be set up which tend to oppose the movement of the rotor. The eddy currents thus have a damping effect which can be varied by moving the magnets nearer or further from the rotor. The number of times the rotor rotates is an indication of the amount of evaporation impinging on the rotor and hence is an indication of the thickness of any deposit of the evaporant whilst the speed of rotation is an indication of the density of the evaporant and hence is an indication of the rate of deposit of the evaporant. The frequency and speed of rotation of the rotor may conveniently be measured using serrations 7 cut into the rotor and arranging that these interrupt a beam of light causing pulses to be set up which can be counted using normal counting techniques. Thus a beam of light from a lamp 8 can be directed onto a sensing head 9 and electrical signals from the head fed to a pulse counter 10. The output from the pulse counter can be arranged to indicate both the instantaneous rate at which the beam of light is interrupted and the total number of such interruptions taking place in an evaporation process. These indications are proportional to the rate of evaporation and thickness of the deposit formed.

Figure 3:
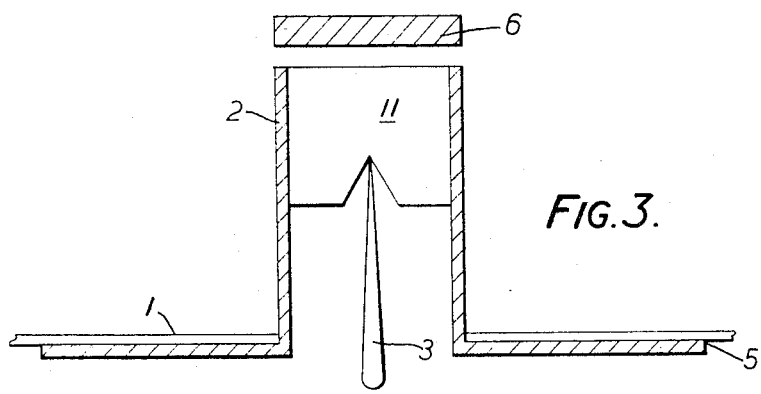
FIGURE 3 shows a construction of a bearing suitable for use in thickness and rate monitors of FIGURES 1 and 2.

FIGURE 3 shows a jewelled-bearing suitable for use in the above described monitors. It consists of a mounting 2 into which is fitted a jewelled bearing 11. The cylindrical or disc type rotor 4 is fitted over the mounting and is held in place by an adhesive 5. The bearing is set on a needle pivot 3 and a retaining bar 6 is positioned above the bearing to prevent physical dislodgement of the rotor.

Figure 4:
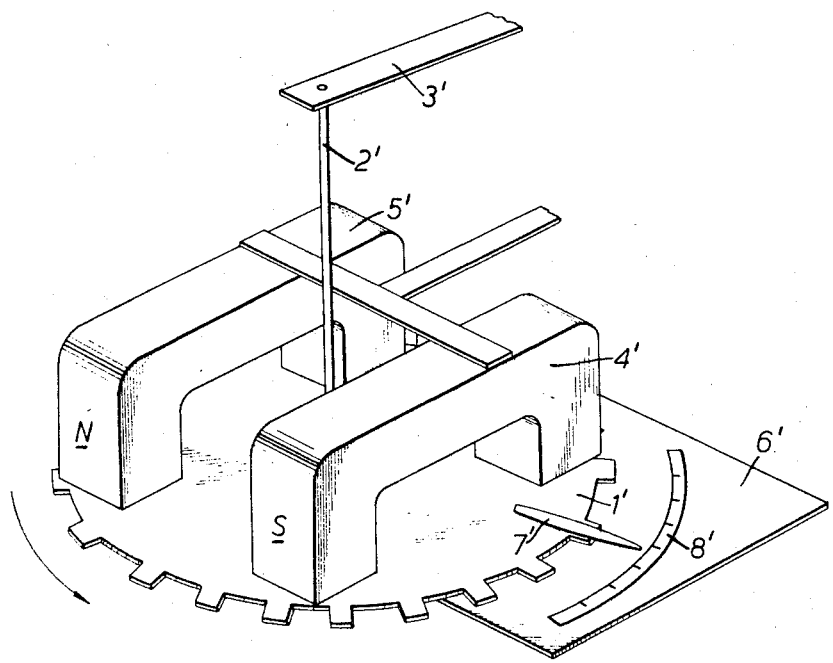
FIGURE 4 shows an alternative method of mounting a rotor using a torsion bar.

A more convenient form of a rate monitor may be obtained using the general construction of FIGURE 2, but instead of the rotor disc having a bearing resting on a needle pivot the rotor is suspended on a torsion bar. This embodiment of the invention is depicted in FIG. 4. In this drawing, a disc-shaped rotor 1' is supported at its center on a torsion bar 2' carried on a bracket 3'. This embodiment also includes magnets 4' and 5' as before and the shield 6' so that evaporating material is able to impinge on only one side of the rotor.

At the periphery of the rotor 1' a pointer 7' is located which is movable along a scale 8' when the rotor is turned through an angle.

In this embodiment, the rotor is not able to be rotated continuously since a tendency to turn prompted by evaporating material impinging on its lower surface causes a twisting of the torsion bar 2' and a restoring couple is set up by the torsion bar which opposes further rotation. The impinging material thus causes the rotor to turn through a particular angle from its rest position until the restoring couple opposes further movement and the rotor comes to rest again. The particular angle through which the rotor has turned can be measured by means of the pointer 7' and scale 8'. This angle then provides a direct indication of the density of evaporated material impinging on the rotor and thus indicates instantaneously the rate of evaporation.

This embodiment differs from that depicted in FIG. 2 in that it has no provision for indicating the total thickness of evaporated material deposited during the process.

Figure 5:
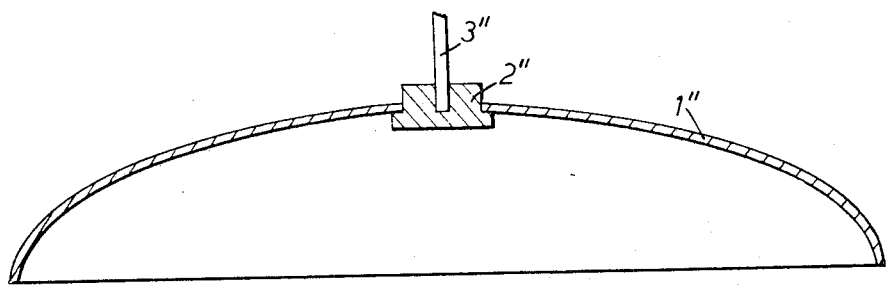
FIGURE 5 is an axial cross-sectional view through a rotor of dished form.

FIG. 5 is an axial cross-sectional view through a rotor of dished form. A rotor 1" in this shape has improved mechanical rigidity over a plane rotor and it can have better stability since its center of gravity will be below the point from which the rotor is suspended. This rotor 1" carries a block 2" at its center to which a torsion bar 3" is fixed.

Each of the assemblies described in the foregoing may be heated up to a temperature of 400° C. in a vacuum.

The foregoing description of thickness and rate monitors are given as examples only and minor modifications regarding materials used, detailed construction and methods of indication may be made without departing from the scope of the invention.

What I claim is:

1. In a vacuum evaporation process, the method of causing evaporated material to impinge on part of the surface of a rotor of a thickness and rate monitoring device, and measuring the total angle of rotation and the instantaneous speed of rotation of the rotor to provide an indication of the thickness of the deposited material and the rate of desposition respectively.

2. A monitoring device for a vacuum evaporation process comprising a rotor upon which evaporating material may impinge to cause the movement of said rotor, means for damping the motion of said rotor, and means for measuring the total angle and the speed of rotation of the rotor without imposing a load on it.

3. A device as claimed in claim 2, in which the rotor comprises a hollow cylinder which is rotatable about its axis.

4. A device as claimed in claim 3, in which the rotor is mounted with its axis vertical on a bearing which is carried on a support.

5. A device as claimed in claim 2, in which the rotor comprises a disc which is supported on a bearing on the axis of the disc, the bearing being above the centre of gravity of the disc.

6. A device as claimed in claim 2, in which the speed of rotation of the rotor is measured by optical means.

7. A device as claimed in claim 6, in which the optical means comprises provision for interrupting a beam of light.

8. In a vacuum evaporation process, the method of causing material being evaporated to impinge upon one of the major surfaces of a rotatable disc of a rate monitoring device, said disc being supported by a suspension element in a first angular position representative of the rest position of said disc, said suspension element imposing a torque on the disc in opposition to rotational movement caused by impingement of the material thereon so that said disc assumes a second steady angular position representative of the rate of evaporation of the material, and measuring the angular displacement between said first and second angular positions.

9. A monitoring device for a vacuum evaporation process comprising a rotatable disc upon which evaporating material may impinge, a suspension element normally supporting said disc in a first angular position representative of the rest position of said disc, said suspension element being adapted to impose a torque on said disc in opposition to the rotational movement caused by the impingement of said material thereon so that said disc assumes a second steady angular position representative of the rate of evaporation of said material, and means for measuring the angular displacement between said first and second angular positions.

10. A device as claimed in claim 9, in which said disc is of dished form.

References Cited

UNITED STATES PATENTS

| 2,554,271 | 5/1951 | Slepian et al. | 73—150 XR |
| 2,829,517 | 4/1958 | Kushner | 73—150 |
| 2,994,821 | 8/1961 | Dravnieks | 73—150 XR |

LOUIS R. PRINCE, Primary Examiner.

JEFFREY NOLTON, Assistant Examiner.

U.S. Cl. X.R.

117—106; 118—9, 48